United States Patent
Pause

(10) Patent No.: US 7,892,988 B2
(45) Date of Patent: Feb. 22, 2011

(54) MEMBRANE MATERIALS WITH THERMO-REGULATING PROPERTIES FOR FABRIC STRUCTURES

(76) Inventor: Barbara Hildegard Pause, 7161 Christopher Ct., Longmont, CO (US) 80503

( * ) Notice: Subject to any disclaimer, the term of this patent is extended or adjusted under 35 U.S.C. 154(b) by 378 days.

(21) Appl. No.: 10/565,311

(22) PCT Filed: Jul. 17, 2004

(86) PCT No.: PCT/US2004/023782

§ 371 (c)(1),
(2), (4) Date: Jan. 18, 2006

(87) PCT Pub. No.: WO2005/009686

PCT Pub. Date: Feb. 3, 2005

(65) Prior Publication Data

US 2006/0223402 A1    Oct. 5, 2006

Related U.S. Application Data

(60) Provisional application No. 60/489,072, filed on Jul. 21, 2003.

(51) Int. Cl.
*B32B 27/12*    (2006.01)

(52) U.S. Cl. .................. 442/131; 442/132; 442/133; 428/913

(58) Field of Classification Search ............. 442/131, 442/132, 133; 428/142–145, 913
See application file for complete search history.

(56) References Cited

U.S. PATENT DOCUMENTS

| | | | |
|---|---|---|---|
| 4,462,390 A * | 7/1984 | Holdridge et al. | 126/587 |
| 4,797,160 A * | 1/1989 | Salyer | 106/660 |
| 5,053,446 A | 10/1991 | Salyer | |
| 5,532,039 A | 7/1996 | Payne | |
| 5,885,475 A | 3/1999 | Salyer | |
| 6,660,667 B2 * | 12/2003 | Zuckerman et al. | 442/131 |
| 2003/0054141 A1 * | 3/2003 | Worley et al. | 428/195 |

* cited by examiner

*Primary Examiner*—Angela Ortiz
*Assistant Examiner*—Jennifer Steele

(57) ABSTRACT

Membrane materials for fabric structures consisting of a woven fabric which is coated on one or both sides with an elastomeric compound comprising finely divided phase change materials such as crystalline alkyl hydrocarbons or salt hydrates. The membrane materials facilitate thermo-regulation due to latent heat absorption and latent heat release in the phase transition range of the phase change material, which enhances the thermal comfort of the enclosed structure, they are applied to and leads to energy savings.

11 Claims, 2 Drawing Sheets

MEMBRANE MATERIALS WITH THERMO-REGULATING PROPERTIES FOR FABRIC STRUCTURES

CROSS-REFERENCES TO RELATED APPLICATIONS

This application claims priority of U.S. provisional application Ser. No. 60/489,072 filed Jul. 21, 2003 entitled "Membrane structures with thermo-regulating properties". The international application Serial No. PCT/US04/23782 entitled "membrane materials with thermo-regulating properties for fabric structures" was filed Jul. 17, 2004 and published Feb. 3, 2005.

BACKGROUND OF THE INVENTION

Membrane materials used for roof structures of buildings provide a relatively low thermal insulation capacity compared to the classic building materials. Therefore, a large amount of heat penetrates daily through such roof structures into the building especially during the summer months leading to an overheating of the buildings interior. On the other side, the nightly heat loss through such roof constructions, especially during the winter months, is significantly high.

The problem can be solved by applying phase change material to membrane materials used in fabric structures. Phase change material is a highly-productive thermal storage medium which possesses the ability to change its physical state within a certain temperature range. When the melting temperature is obtained during a heating process, the phase change from the solid to the liquid state occurs. During this melting process, the phase change material absorbs and stores a large amount of latent heat. The temperature of the phase change material remains nearly constant during the entire process. In a cooling process of the phase change material, the stored heat is released into the environment in a certain temperature range, and a reverse phase change from the liquid to the solid state takes place. During this crystallization process, the temperature of the phase change material also remains constant. The high heat transfer during the melting process and the crystallization process, both without any temperature change, is responsible for the phase change material's appeal as a source of heat storage.

In order to contrast the amount of latent heat absorbed by a phase change material during the actual phase change with the amount of sensible heat absorbed in an ordinary heating process, the ice-water phase change process will be used. When ice melts, it absorbs an amount of latent heat of about 335 J/g. When the water is further heated, it absorbs a sensible heat of only 4 J/g while its temperature rises by one degree C. Therefore, the latent heat absorption during the phase change from ice into water is nearly 100 times higher than the sensible heat absorption during the heating process of water outside the phase change temperature range.

In addition to ice (water), more than 500 natural and synthetic phase change materials are known. These materials differ from one another in their phase change temperature ranges and their latent heat storage capacities.

Currently, only crystalline alkyl hydrocarbon phase change materials having different chain lengths are used in textile applications and more specifically in garment applications. Characteristics of these phase change materials are summarized in Table 1.

TABLE 1

Crystalline alkyl hydrocarbons

| Crystalline alkyl hydrocarbons | Formula | Melting temperature, °C. | Crystallization temperature, °C. | Latent heat storage capacity, J/g |
|---|---|---|---|---|
| Heneicosane | $C_{21}H_{44}$ | 40.5 | 35.9 | 213 |
| Eicosane | $C_{20}H_{42}$ | 36.1 | 30.6 | 247 |
| Nonadecane | $C_{19}H_{40}$ | 32.1 | 26.4 | 222 |
| Octadecane | $C_{18}H_{38}$ | 28.2 | 25.4 | 244 |
| Heptadecane | $C_{17}H_{36}$ | 21.7 | 16.5 | 213 |

The crystalline alkyl hydrocarbons are either used in technical grades with a purity of approximately 95% or they are blended with one another in order to cover specific phase change temperature ranges. The crystalline alkyl hydrocarbons are nontoxic, non-corrosive, and non-hygroscopic. The thermal behavior of these phase change materials remains stable under permanent use. Crystalline alkyl hydrocarbons are byproducts of petroleum refining and, therefore, inexpensive.

Salt hydrates are alloys of inorganic salts and water. The most attractive properties of salt hydrates are the comparatively high latent heat storage capacities, the high thermal conductivities and the small volume change during melting. Salt hydrates often show an incongruent melting behaviour as a result of a lack in reversible melting and freezing making them unsuitable for permanent use. Salt hydrates with reversible melting and freezing characteristics are summarized in Table 2.

TABLE 2

Salt hydrates

| Salt hydrates | Melting temperature, °C. | Latent heat storage capacity, J/g |
|---|---|---|
| Calcium cloride hexahydrate | 29.4 | 170 |
| Lithium nitrate trihydrate | 29.9 | 296 |
| Sodium hydrogen phosphate dodecahydrate | 36.0 | 280 |

In the present applications of the phase change material technology in textiles, the crystalline alkyl hydrocarbon are microencapsulated, i.e., contained in small micro-spheres with diameters between 1 micron and 30 microns. These microcapsules with enclosed phase change material are applied to a textile matrix by incorporating them into acrylic fibers and polyurethane foams or by embedding them into a coating compound and coating them onto textile surfaces.

U.S. Pat. No. 4,756,958 reports a fiber with integral microspheres filled with phase change material which has enhanced thermal properties at predetermined temperatures.

U.S. Pat. No. 5,366,801 describes a coating where microspheres filled with phase change material are incorporated into a coating compound which is then topically applied to fabric in order to enhance the thermal characteristics thereof.

U.S. Pat. No. 5,637,389 reports an insulating foam with improved thermal performance, wherein micro-spheres filled with phase change material are embedded.

The micro-encapsulation process of crystalline alkyl hydrocarbon phase change materials is a very time-consuming and complicated chemical process running over several stages making the microcapsules with enclosed phase change material very expensive.

There are several thermal effects which can be obtained by a phase change material application in a certain product, such as:
- A cooling effect, caused by heat absorption of the phase change material.
- A heating effect, caused by heat emission of the phase change material.
- A thermo-regulating effect, resulting from either heat absorption or heat emission of the phase change material.

The efficiency of each of these effects is determined by the latent heat storage capacity of the phase change material, the phase change temperature range and the structure of the carrier system.

The total latent heat storage capacity of the phase change material in a product depends on the phase change material's specific latent heat storage capacity and its quantity. In order to obtain a successful phase change material application, the phase change temperature range and the application temperature range need to correspond.

Currently, membrane materials used for fabric structures are made of polyvinyl chloride (PVC)-coated woven polyester, poly tetra fluorine ethylene (PTFE)-coated woven fiberglass and silicone-coated woven fiberglass. The woven polyester or fiberglass fabrics provide the basic structure of the material. The mechanical properties (tensile strength, elongation and dimensional stability) of the membrane material are determined by the mechanical properties provided by the fabric construction. The PVC, PTFE or silicone coating is provided to one or both sides of the fabric in order to protect the fabrics against the infiltration of moisture, chemicals and micro-organism which could destroy the fabric construction and reduce its tensile strength. Furthermore, the coating of the fabric surface fixes the unstable fabric geometry and protects the fibers from the sun's damaging ultra violet rays.

All of the membrane materials used for fabric structures are lightweight and thin. Therefore, their thermal resistance is very low compared to other building materials. In order to improve the thermal performance of membrane roofs, they are arranged in several layers with air layers in between. The visible light transmission of PVC coated polyester fabrics and PTFE coated fiberglass fabrics does not exceed 20% and is, therefore, very low.

Membrane materials used in fabric structures have a limited service life of about 25 years due to the aging of synthetic materials. The aging of synthetic materials is caused by the ultra violet portion of the solar radiation. As a result of this radiation, chemical and physical-chemical reactions take place which lead to changes in the molecular structure of the membrane's coating. The aging process is accelerated by high temperatures to which the membrane material can be brought up during the afternoon hours and substantial temperature fluctuation during the day.

SUMMARY OF THE INVENTION

The invention pertains to membrane materials used for fabric structures consisting of a multi-layer composite fabrics wherein at least one of the layers contain finely divided phase change materials such as crystalline alkyl hydrocarbons or salt hydrates. By either latent heat absorption or latent heat emission without temperature changes, the phase change material adds a thermo-regulating feature to the membrane material. The design of the newly-invented membrane materials allows for a latent heat storage capacity of up to 150 kJ/m$^2$. Using the developed membrane materials in a fabric roof structure, a phase change material is required which absorbs latent heat when the membrane material's temperature rises above 30° C. and releases latent heat when the membrane material's temperature drops below 20° C. The application of phase change materials in membrane materials used in building enclosures will lead to an enhance thermal comfort and significant energy savings.

In order to manufacture the invented membrane materials, an elastomeric coating compound, such as a silicone rubber, containing the finely divided phase change material in a quantity of up to 60 wt. % is applied onto one or both sides of a basic fabric, such as a woven polyester or a woven fiberglass.

DETAILED DESCRIPTION OF THE INVENTION

Figure 1:
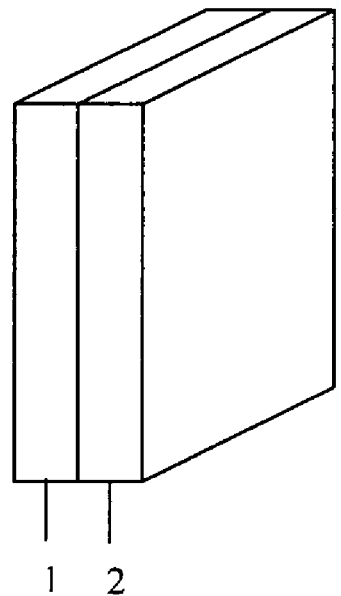
FIG. 1 is a sectional view of a membrane material consisting of a composition of a woven fabric and an elastomeric coating compound which is applied to one side of the woven fabric where phase change material is incorporated into the elastomeric coating compound.

It has been discovered that crystalline alkyl hydrocarbons and salt hydrates can be durably contained in an elastomer whereby the phase change materials are cross-linked into the elastomer's structure. For this purpose, the phase change material does not need to be microencapsulated. Finely-divided phase change materials emulsified or dispersed in the elastomer's structure do not flow out of the elastomer structure while in a liquid stage. The composition remains stable under substantial temperature variation over a long service life.

Such elastomeric materials can comprise, by way of example and not by limitation silicone rubber, acrylate rubber, butyl rubber, nitrile rubber or chloroprene rubber. Furthermore, thermoplastic elastomers with, for instance, fluorine, polyurethane or polyester as basic components are also suitable containment structures for the phase change material application.

In order to describe the process in which phase change materials such as crystalline alkyl hydrocarbons and salt hydrates can be durably contained in an elastomeric structure silicone rubber shall be used as an example.

There are several methods that can be applied in order to produce silicone rubber. For containing phase change material inside the silicone rubber matrix, the most appropriate method uses liquid silicone rubbers. Liquid silicone rubbers are paste-like flow-able, two-component blends. Liquid silicone rubbers possess a lower viscosity than solid rubbers which is advantageous for forming the product into a desired shape. Phase change materials (available in a liquid form after melting) can be easily mixed into the two liquid components the silicone rubber consist of.

Liquid silicon rubbers are available in different versions. Some of the standard types provide an exceptional mechanical strength and elasticity. There are liquid silicone rubbers available which cure in a very short period of times. Another liquid silicone rubber system possesses a very high flame resistance. They are all supplied ready for processing. One of the two components contains, for instance, a platinum catalyst and the other component a hydrogen-functional polysiloxane cross-linking agent.

The crystalline alkyl hydrocarbons or the salt hydrates create a third component which needs to be mixed into the system while they are in a liquid stage. The crystalline alkyl hydrocarbons or the salt hydrates may be incorporated into the silicone rubber matrix in a weight portion of up to 60 wt. % based on the material's total weight. Preferably, the phase change materials are incorporated into the silicone rubber matrix in portions of 30 wt. % to 50 wt. %. These quantities of phase change material ensure a substantial increase in thermal performance. On the other side, the desired mechanical strength, flexibility and durability characteristics of the silicone rubber material can also be maintained. The hardness could be decreased, if necessary, by further adding silicone fluid.

After the three components are thoroughly mixed together the compound is topically applied to a basic fabric made of woven polyester or woven glassfiber, for instance, by knife coating.

Figure 2:
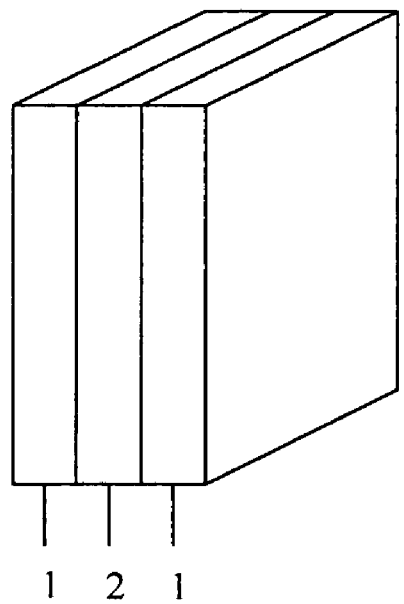
FIG. 2 is a sectional view of a membrane material consisting of a composition of a woven fabric and an elastomeric coating compound which is applied to both sides of the woven fabric and where phase change material is incorporated into the elastomeric coating compound.

FIG. 1 and FIG. 2 show the two suitable arrangements of the elastomeric material with the incorporated phase change material (1) in a membrane composite, i.e. the elastomeric coating compound is applied either to one or to both sides of the woven basic fabric (2).

Figure 3:
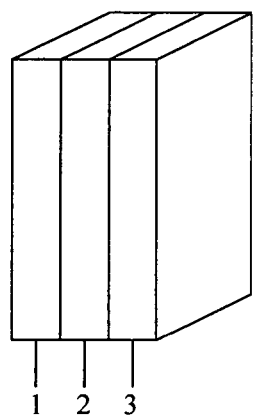
FIG. 3 is a sectional view of a membrane material consisting of a composition of a woven fabric and an elastomeric coating compound which is applied to one side of the woven fabric and where phase change material is incorporated into the elastomeric coating compound and another coating compound is applied to the other side of the woven fabric which does not contain phase change material.

FIG. 3 shows an arrangement where the elastomeric coating compound with the incorporated phase change material is applied to one side of the woven fabric and the other side of the woven fabric is coated with another coating compound which does not contain phase change material (3).

The silicone rubber with the incorporated phase change material is cured following the coating process. The rate of curing depends on the temperature. The higher the temperature, the faster the curing process will be performed. In order to avoid a water separation and evaporation of the water component of salt hydrates, silicone rubber with incorporated salt hydrates should be cured at temperatures below 80° C. Preferably, most silicone rubber systems with incorporated phase change materials shall be cured at room temperature or other temperatures below 75° C. Addition-curing components do not release any by-products that have to be removed by any form of after-treatment or post-curing. When bonding the silicon rubber material with incorporated phase change material to a material with a plain surface, a primer should first be used before the coating process to achieve a sufficient adhesion between the silicone rubber material and the woven fabric.

Silicone rubber is thermally stable in a temperature range between −50° C. and 200° C. Furthermore, the material shows favourable strength characteristics, flexibility and durability.

In a roof application of the membrane material, the phase change material shall absorb the heat provided by the solar radiation during the day as soon as the membrane material's temperature exceeds a given value. During the heat absorption by the phase change material, its temperature and the temperature of the surrounding membrane material remains nearly constant. Therefore, the heat absorption by the phase change material reduces the heat flux into the building during the day. Especially on hot summer days, the thermal comfort inside the building will be enhanced significantly as a result of the phase change material's heat absorption feature. The phase change material releases the stored heat overnight in a reverse cooling process, which also reduces the heat flux through the membrane structure and, therefore, results in a significant reduction of the nightly heat loss through the roof.

In order to obtain a durable and efficient thermo-regulating effect through the application of phase change material in membrane materials used for fabric structures, the phase change material needs to be carefully selected and applied in a sufficient quantity. Temperature measurements in membrane constructions were carried out in order to investigate the temperature range in which the phase change material should absorb heat. The appropriate temperature range for the latent heat absorption of the phase change material was determined to be about 30° C. to 50° C. Considering this temperature range, a phase change material was selected which absorbs latent heat in a temperature range between 30° C. and 39° C. and releases heat in a temperature range between 15° C. and 20° C. The chosen phase change material is a non-combustible salt hydrate which possesses a high latent heat storage capacity of about 230 J/g. Based on the phase change materials content of 40 wt. % in the silicone rubber matrix, a latent heat storage capacity of about 92 kJ/m$^2$ was obtained in a preliminary trial. This is a substantial increase in the heat storage capabilities of membrane structures. In order for an ordinary membrane material made of PVC coated polyester to absorb the same amount of heat, its temperature would need to be raised by about 75 degrees C.

Some technical data of one of the newly-developed membrane materials (silicone rubber coating with phase change material on a fiberglass fabric) and two ordinary membrane materials (a PVC coated polyester fabric and a silicone coated fiberglass fabric) used in a variety of building envelopes are summarized in Table 3.

TABLE 3

Technical data of selected membrane materials

| Membrane material | Weight/area, g/m$^2$ | Thickness, mm | Density, kg/m$^3$ |
|---|---|---|---|
| PVC coated polyester | 1245 | 1.0 | 1245 |
| Silicone coated fiberglass | 830 | 0.7 | 1185 |
| Silicone rubber coating with phase change material on fiberglass | 1210 | 1.4 | 865 |

The membrane materials summarized in Table 3 have been tested regarding their thermal insulation properties. The test results are summarized in Table 4. The basic thermal resistance characterizes the thermal resistance value of the specific membrane material. The heat absorption of the phase change material, which takes place when a certain temperature is obtained in a heating process, leads to a temporary decrease in the heat flux through the membrane material causing an additional insulation effect, called "dynamic thermal resistance". The total thermal resistance of a membrane material equipped with phase change material is the sum of the material's basic thermal resistance and the dynamic thermal resistance by heat absorption of the phase change material. For membrane materials without phase change material the total thermal resistance equals the material's basic thermal resistance.

TABLE 4

Thermal insulation properties of selected membrane materials

| Membrane material | Basic thermal resistance, $m^2K/W$ | Dynamic thermal resistance by heat absorption of the phase change material, $m^2K/W$ | Total thermal resistance, $m^2K/W$ |
|---|---|---|---|
| PVC coated polyester | 0.0073 | — | 0.0073 |
| Silicone coated fiberglass | 0.0054 | — | 0.0054 |
| Silicone rubber coating with phase change material on fiberglass | 0.0096 | 0.0230 | 0.0326 |

All of the membrane materials possess a low thermal resistance due to their low thickness and high density. However, the heat absorption by the phase change material during the day provides an additional (dynamic) thermal resistance which results in a temporary increase of the material's total thermal resistance by about 140%.

The daily latent heat absorption and the nightly latent heat emission of the phase change material limit the heat flux into and out of a building covered with a membrane roof to which phase change material is applied. A comparison test was carried out using two model buildings. One of the model buildings was equipped with a roof structure made of a PVC coated polyester fabric. The roof of the second model building consisted of a silicone rubber coating with phase change material on a fiberglass fabric. In both test configurations, only a single layer membrane construction was used. The two membrane materials possess similar weights and show only slight differences in their thickness. Temperature measurements were carried out at the same distance underneath the two membrane structures. The temperature developments obtained for the two model buildings on the same day are shown in FIG. 4.

Figure 4:
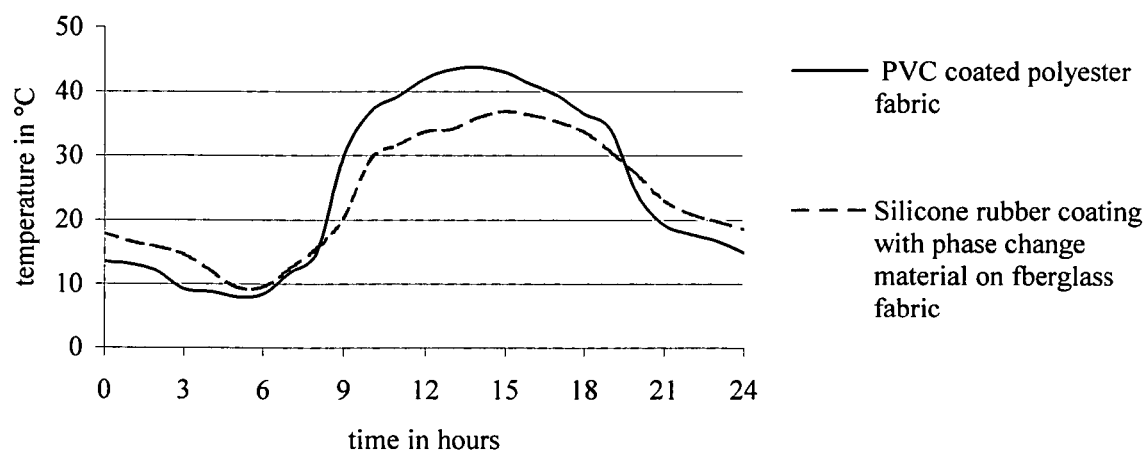
FIG. 4 is a graphical representation of the temperature development in a model building where membrane roof structures have been used with and without phase change material.

The test results, shown in FIG. 4, indicate that there is a substantial delay in the temperature increase during the day due to the latent heat absorption by the phase change material. The latent heat absorption by the phase change material leads to temperature differences of up to 9 degrees C. between the two buildings. Furthermore, there is also a delay in the temperature decrease overnight due to the latent heat release of the phase change material. However, the test results indicate that the membrane material in its current makeup especially supports the latent heat absorption process by the phase change material. The overall daily temperature fluctuations measured under the specific climatic conditions were reduced by about 8.5 degrees C. due to the thermo-regulating feature (latent heat absorption and latent heat emission) of the phase change material. Due to the lower temperature increase during the day and the reduction in the daily temperature fluctuations, a substantial delay in the aging process of the newly-developed membrane material is expected.

The membrane material with phase change material also shows an interesting feature regarding light transmission. The translucency of the newly-developed membrane materials exceeds the translucency of the membrane materials made of a PVC coated polyester fabric and a silicone coated fiber glass fabric significantly.

Furthermore, the translucency of the newly-developed membrane materials changes in the course of the day. The silicone rubber layer with the phase change material becomes transparent as soon as the phase change material is completely melted. On the other side, when the phase change material crystallizes the silicone rubber layer with the phase change material becomes opaque. The difference in the light transmission between the two states of the phase change material incorporated into the silicone rubber which is coated onto the fiber glass fabric totals 15%. The test results received for the membrane materials are summarized in Table 5.

In contrast to common silicone coated fiber glass, the dirt repellency of the surface of the newly-developed membranes consisting of silicone rubber coating with phase change material on fiberglass is very satisfactory. In a recent lab trial, dirt particles on the surface of such membrane materials were easily removed with a cloth. In a building application, the dirt particles will be washed away by rain due to their low adhesion to the membrane's surface.

TABLE 5

Light transmission of the selected membrane materials

| Membrane material | Translucency, % |
|---|---|
| PVC coated polyester | 5 |
| Silicone coated fiberglass | 23 |
| Silicone rubber coating with phase change material (in solid state) on fiberglass | 39 |
| Silicone rubber coating with phase change material (in liquid state) on fiberglass | 54 |

Furthermore, the newly-developed membrane materials possess a high tensile strength, a durable elasticity, and a high dimensional stability. They meet the non-combustible requirement.

The thermal effect provided by the phase change material contained in the membrane materials has been proven to be durable in more than 1000 thermo-cycles. The phase change material application in membrane materials used for fabric structures will lead to a better thermal comfort inside buildings made of them and to substantial energy savings.

What is claimed is:

1. A membrane material for fabric structures having enhanced reversible thermal properties, said membrane material comprising a basic woven fabric which is coated continuously at least on one side with a polymeric compound consisting of an elastomeric material, at least one phase change material and a cross-linking agent whereby the phase change material is first melted into a liquid and mixed into a liquid component of the elastomeric material and then the cross-linking agent is added to the mixture which is applied to the basic woven fabric by knife coating and cured there, whereby the cross-linking agent cross-links the phase change material into the structure of the elastmeric material while in its liquid stage and said membrane material becomes more translucent when the phase change material changes from its solid into its liquid stage during absorption of latent heat which also reduces the heat flux through the membrane material into the fabric structure.

2. The membrane material according to claim 1, wherein the woven fabric is coated on both sides with the polymeric compound.

3. The membrane material according to claim 1, wherein the woven fabric is coated on one side with the polymeric compound and no coating is applied to the other side of the fabric.

4. The membrane material according to claim 1, wherein the woven fabric is coated on one side with the polymeric compound and is coated on the other side with a second polymeric compound which does not contain any phase change material.

5. The membrane material according to claim 1, wherein the phase change material is a crystalline alkyl hydrocarbon.

6. The membrane material according to claim 1, wherein the phase change material is a salt hydrate.

7. The membrane material according to claim 1, wherein the polymeric compound comprises a phase change material in a quantity of up to 60 wt. %, based on the total weight of the polymeric compound.

8. The membrane material according to claim 1, wherein the phase change material has a melting point in the range between 30° C. and 50° C.

9. The membrane material according to claim 1, possessing a latent heat storage capacity of up to 150 kJ/m$^2$.

10. The membrane material according to claim 1, wherein the polymeric compound contains flame-retarding additives.

11. The membrane material according to claim 1, wherein translucency changes in connection with a phase transition of the phase change material.

* * * * *